UNITED STATES PATENT OFFICE 2,166,949

SULPHONATED ARYLIDES

Lawrence H. Flett, Hamburg, N. Y., assignor to National Aniline and Chemical Company, Incorporated, New York, N. Y., a corporation of New York No Drawing. Application April 13, 1937, Serial No. 136,601

15 Claims. (Cl. 260—404)

The present invention relates to sulphonation products useful as detergents and as penetrating, wetting, and the like agents, and to processes for preparing them.

It is an object of the present invention to provide new sulphonation products which are valuable detergents and penetrating, wetting, emulsifying, finishing, and the like agents, and which are characterized by their stability in acid and alkaline solutions.

Another object of the present invention is to provide new sulphonation products which are valuable detergents and penetrating, wetting, emulsifying, finishing, and the like agents, and which may be economically produced on a commercial scale.

A further object of the invention is to provide a simple and economical process whereby new sulphonation products may be produced.

Other objects of the invention will in part be obvious and will in part appear hereinafter.

It has been proposed to employ sulphonation products of unsubstituted and substituted fatty acid arylides in the field of detergents and wetting agents. While sulphonation products of this class are of value for many purposes, in general they possess low stability to the hydrolyzing action of acids and alkalies, particularly at elevated temperatures. Since these conditions are frequently encountered in the textile and other industries where wet treatment processes are employed, there remains a wide field of operations where most members of this class of compounds may not be satisfactorily employed.

The present invention is concerned with sulphonation products of this general class, but the products of the present invention, as contrasted with other members of this class, are characterized by their stability to hydrolyzing agents, and, hence, are available for use in processes where strongly acid or alkaline baths are employed.

The compounds of the present invention are sulphonates of ortho-substituted arylides of fatty acids in which the fatty acid (acyl) radical is a derivative of a fatty acid containing at least 5, preferably at least 12, and especially 12 to 18, carbon atoms. The compounds may be in the form of the free sulphonic acids or in the form of the salts thereof. In the form of the free sulphonic acids, they may be represented by the following general formula:

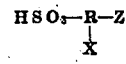

wherein R represents an aromatic nucleus; Z represents the radical

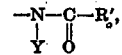

in which Y represents hydrogen or an alkyl radical and R' represents an open-chain aliphatic radical containing at least four carbon atoms; and X represents a substituent, other than a hydroxyl group, in the aromatic nucleus in the ortho position to the radical represented by Z. The substituent represented by X may be, for example, halogen or an alkyl, aryl, alkoxy, aryloxy, carboxyl, or esterified carboxyl radical.

In view of the instability of aminophenol and of the tendency of arylides of fatty acids having a hydroxyl group as an orthosubstituent to form undesirable by-products, the ortho-substituted arylides of the present invention do not contain a hydroxyl group as a substituent in the aromatic nucleus in the orthoposition to the acylamino radical. Hence, where in the specification reference is had to ortho-substituted arylides, or anilides, of fatty acids, compounds containing a hydroxyl radical in the orthoposition to the acylamino radical are not included. The aromatic nucleus represented by R may be further substituted, particularly in the remaining orthoposition, as for example, by one of the above substituents. The radical represented by R' may be saturated or unsaturated, and may contain inorganic substituents, as for example —OH, —SO₃H, and —SO₄H; and the radical represented by Y may also contain substituents.

The sulphonation products of nuclear substituted acyl anilides containing a nuclear substituent other than a hydroxyl group ortho to the acylamino group in which the acyl radical is a derivative of a fatty acid containing at least 5 carbon atoms, and preferably 12 to 18 carbon atoms, are of especial interest in connection with the present invention. These compounds, in the form of the free acids, correspond with the following general formula:

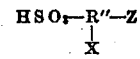

wherein R" represents a benezene nucleus (which may or may not be further substituted) and Z and X have the same meaning as above.

The compounds of the present invention are characterized by the excellent detergent and penetrating qualities which they impart to their aqueous solutions, especially when they are accompanied in such aqueous solutions by small amounts of soap. Further, they have the ability to increase markedly the viscosity of their aqueous solutions over that of water. When employed in the presence of hard water they prevent the precipitation or deposition of otherwise insoluble calcium or magnesium salts.

The sulphonated ortho-substituted arylides of this invention are markedly superior to the unsubstituted and the meta and para substituted compounds in that they possess considerably greater stability toward hydrolyzing agents than the latter compounds. The fatty acid radicals of the ortho-substituted arylides are hydrolyzed with great difficulty. Thus, the sulphonated ortho-substituted arylides of the present invention are not hydrolyzed to any appreciable extent by prolonged action of acids or alkalies even at the relatively high temperatures reached in textile treating processes in which the sulphonated ortho-substituted arylides of this invention may be employed. This stability of the compounds of this invention toward the hydrolyzing action of acids and alkalies renders them of particular value for employment as assistants in acid dyeing processes which are carried out at relatively high temperatures and also in alkaline processes in which the treatment is carried out at elevated temperatures, as for example, in the kier boiling of cotton. Further, the sulphonation of ortho-substituted arylides results in advantageous purity and yield, since in the course of sulphonation of the ortho-substituted arylides they are not noticeably hydrolyzed.

The sulphonation product of the ortho-toluidid of stearic acid is a specific preferred embodiment of the present invention. This product may be produced at a low cost by the process hereinafter described, and, in addition to having the property of imparting to its solutions superior detergent and wetting properties, it possesses properties making it suitable for use as a textile finishing agent. When employed as a textile finishing agent, it has been found to produce results equivalent to those obtained with agents which are available only at a much higher cost.

In the preparation of the sulphonation products in accordance with a preferred method of procedure, an ortho-substituted arylide of a fatty acid having at least 5 carbon atoms is subjected to sulphonation, as for example, by treatment with oleum, sulphuric acid, or chlorsulphonic acid to form a water-soluble sulphonation product. The sulphonation products may be employed in the form of the free acids or in the form of salts thereof. The salts may be produced by neutralizing the free acids with inorganic or organic bases. Further, when an excess of the sulphonating agent is used, the sulphonation product containing residual sulphonating agent may be neutralized to produce a mixture of the sulphonic acid salt and inorganic salts. If it is desired to prepare the sulphonic acid salt in a form relatively free from inorganic salts, the sulphonic acid salt may be extracted from the mixture of salts by an organic solvent in which the sulphonic acid salt is soluble but the inorganic salts are insoluble (e. g. alcohol), or the sulphonic acid may be separated from the sulphonation reaction mixture by well-known methods and then neutralized.

The invention is illustrated by the following examples in which the parts are by weight.

*Example 1.*—60 parts of the ortho-toluidid of stearic acid are added to a mixture of 56 parts of sulphuric acid monohydrate and 60 parts of 26 per cent oleum. The mixture is allowed to warm up to a temperature between 50° C. and 55° C. and is held at this temperature until a sample of about 1 cc. of the sulphonation mixture is completely soluble in about 20 cc. of hot water at about 60° C. The mixture is then poured into about 1000 parts of water and neutralized with sufficient caustic soda to make the solution neutral to both Brilliant Yellow paper and Congo Red 4B paper. The neutral solution is evaporated to dryness. The final dry product, which contains stearyl-ortho-toluidid-sodium-sulphonate associated with inorganic salts (e. g. sodium sulphate), is a white to yellow-brown friable solid that can be flaked or powdered readily, and is soluble in water.

The stearyl-ortho-toluidid-sodium-sulphonate is soluble in alcohol and if desired can be separated from the mixed sulphonation product by means thereof. For example, the dry product of the above example can be extracted with denatured alcohol (not less than 60 per cent alcohol and balance as water and denaturants), and the alcohol extract can be evaporated to obtain stearyl-ortho-toluidid-sodium-sulphonate free from all but relatively small amounts of alcohol-insoluble impurities such as inorganic salts. The purified product is a white, soft, water-soluble solid, which resembles in appearance and texture a hard white soap.

The dry product dissolves in water and yields aqueous solutions which have excellent washing and penetrating powers, when applied for example to textile materials. The solutions foam, and have the power of emulsifying or dissolving relatively large quantities of water-insoluble organic liquids. It may be used generally as a soap substitute, wetting agent, and emulsifying agent. An excellent aqueous solution for washing wool may be prepared by employing a mixture of the relatively salt-free sodium sulphonate of stearyl-ortho-toluidid, and a small amount of a fatty acid soap (e. g. sodium stearate).

*Example 2.*—The equimolecular weight of the ortho-toluidid of palmitic acid is substituted for the ortho-toluidid of stearic acid in the process of Example 1. A similar product is obtained.

*Example 3.*—A mixture of the ortho-toluidids of the fatty acid mixture produced by hydrolyzing cocoanut oil, and containing the ortho-toluidid of lauric acid mixed with other fatty acid ortho-toluidids, is substituted on an equimolecular basis for the ortho-toluidid of stearic acid in Example 1. A mixed product having similar advantageous properties is obtained.

As previously noted, in the preparation of the sulphonated products, fatty acid arylides corresponding to fatty acids which contain at least 5 carbon atoms may be employed. However, where the acyl groups of the sulphonated arylides contain 12 or more carbon atoms and particularly 12 to 18 carbon atoms the arylides have special value as detergents and as penetrating and wetting agents. While the sulphonated arylides having acyl groups containing from 5 to 11 carbon atoms have good wetting properties, they have somewhat less value as detergents.

It will be understood that the invention is not limited to sulphonation products of ortho-toluidids of fatty acids illustrated above, but also includes sulphonation products of other arylides of fatty acids containing at least 5 carbon atoms and having a substituent other than a hydroxyl group in the aryl radical ortho to the acylamino group. While the preferred products are the anilides of fatty acids of the type specified, the products may be arylides derived from aromatic amino compounds containing other aryl nuclei. For example, the invention includes sulphonation products of naphthylides of fatty acids which are derivable from the fatty acids and naphthylamine compounds which have a substituent other than a hydroxyl group ortho to the amino group. The sulphonation products will contain in the aryl radical the orthosubstituent, which as before indicated may be a halogen atom or a radical selected from the group consisting of alkyl, aryl, alkoxy, aryloxy, carboxyl, and esterified carboxyl radicals, a sulphonic acid group, and may, in addition, contain other substituents, preferably in the remaining orthoposition. Further, N-alkyl derivatives of the products of the classes mentioned are included within the scope of the invention and are valuable detergents, wetting, and the like agents.

While the invention has been specifically illustrated by processes in which ortho-substituted arylides of saturated fatty acids are sulphonated, processes for the preparation of new sulphonation products of arylides of unsaturated fatty acids or of fatty acids containing hydroxyl groups are also included within the scope of the invention. When employing intensive sulphonating conditions or when sulphonating an arylide of an unsaturated or hydroxy fatty acid, the product obtained may contain, in addition to the sulphonic acid group in the aryl nucleus, sulphonic acid or sulphuric ester groups in the fatty acid chain (acyl radical). Where the term "fatty acid" is employed herein it is intended to include, in addition to the saturated fatty acid compounds, the unsaturated fatty acid compounds and the fatty acid compounds containing one or more hydroxyl groups.

In view of the foregoing discussion it will be readily apparent that ortho-substituted arylides derivable from a wide variety of ortho-substituted arylamines and fatty acids may be employed as starting materials to prepare the sulphonation products of the present invention. Thus, such compounds as the ortho-toluidids of oleic acid and lauric ac'd; the ortho-anisidides of stearic acid, palmitic acid, oleic acid, lauric acid, and the mixture of acids resulting from the saponification of cocoanut oil; and the ortho-chloranilides of stearic acid, palmitic acid, oleic acid, lauric acid, and the mixture of acids resulting from the saponification of cocoanut oil are additional specific examples of arylides, which upon sulphonation are converted to sulphonation products that are valuable detergent, wetting, and the like agents, and are characterized by their stability in acid and alkaline solutions.

For preparing the sulphonated ortho-substituted arylides of this invention, the sulphonating step may be carried out in any suitable manner. Thus, the appropriate ortho-substituted arylide can be sulphonated by means of 66° Bé. or stronger sulphuric acid, or oleum or chlorsulphonic acid or mixtures of any two or more of these. Oleum and chlorsulphonic acid have the advantage of effecting the required degree of sulphonation more rapidly with less excess acid and at lower temperatures than are required with ordinary strengths of sulphonic acid. The weaker sulphonating agents as compared with the stronger sulphonating agents require more acid, higher temperature and longer reacting time to complete the sulphonations to the desired water-soluble stage. It will be understood, therefore, that the temperatures employed in the above examples may be varied within wide limits depending upon the sulphonating agent employed and the characteristics of the arylide being treated. The sulphonation may also be effected in the presence of inert solvents such as carbon tetrachloride, dichlorethylene, etc. In some cases, these solvents separate and are removed from the aqueous mixtures which are obtained after the sulphonation mass is drowned; in other cases, they may be removed by steam-distilling or evaporating the neutralized sulphonate solutions to dryness.

For neutralizing the sulphonated ortho-substituted arylides, other inorganic alkaline substances such as, for example, other alkali-metal hydroxides, may be employed in place of the caustic soda of the above examples. Further, organic bases may be employed, as for example, mono-, di-, or triethanol-amine, aniline, ethylene-diamine, amylamine, benzylamine, pyridine, etc. The selected base or a mixture of bases may be used to neutralize the water diluted sulphonation mass wholly or in part. The organic base salts of the sulphonated ortho-substituted arylides may also be obtained, if desired, by double decomposition of the alkali-metal salts of the sulphonated arylides with salts of the organic bases adapted to produce salts in which the sulphonic acid is neutralized by one or a mixture of the bases. The salts of the sulphonic acids are in general full equivalents of the free acids. Hence, where in the appended claims reference is made to the sulphonic acids it will be understood that the salts thereof are included within the scope of said claims, unless otherwise indicated.

The sulphonation products of ortho-substituted arylides of fatty acids of the present invention may be employed for a wide variety of purposes where advantage may be taken of their hydrotropic, detergent, wetting, emulsifying, and the like properties, and their stability to hydrolyzing agents. Thus, they may be employed as detergents in aqueous solutions for cleansing textile fibers, e. g., wool fibers; in combination with ordinary soaps in detergent and wetting mixtures where they additionally act to prevent the precipitation of soap from the solution; as emulsifying agents for the preparation of various types of emulsions, as, for example, emulsions of mineral oils in water; as penetrating and wetting agents in baths for the bleaching, stripping, mercerizing, and carbonizing of textile fibers and fabrics; and as assistants in the bowking and fulling of textile materials.

Further, the sulphonation products of the present invention may be employed with advantage as wetting, penetrating, emulsifying, and colloidizing agents, in the printing, padding, and dyeing of textile fibers. For example, they may be employed in solutions containing naphthol AS compounds intended for application to textile materials by the padding process; as assistants in dyeing cellulose acetate with dispersed dyestuffs; in the dyeing of wool in acid baths where their stability to acids is of particular advantage; as penetrating agents in the mordanting of textile materials; as wetting and penetrating agents in alkaline reducing baths containing vat dyes; and in after treating baths for dyed textile materials where they are effective in increasing the brilliancy of the dyeings and improving the feel of the materials.

The following examples are illustrative of processes in which the products of the present invention may be used with advantage. The parts are by weight.

*Example 4—Washing.*—2.5 parts of wool are soiled with a mixture of mineral oil, tallow, and lamp black until the wool shows a whiteness of 14 per cent when compared with barium oxide in the Zeiss-Pulfrich Photometer. The soiled wool is then washed in 250 parts of water having 10 degrees of hardness due to the presence of calcium chloride (equivalent to 10 grams of calcium carbonate per U. S. gallon of water) and containing 0.5 part of the sodium sulphonate of stearyl orthotoluidide containing inorganic salts and prepared as described in Example 1, part 1. The washing is carried out by agitating the wool with the water solution for 30 minutes in a launder-meter while maintaining the temperature at about 50 degrees C. As a result of the washing, the whiteness of the wool is increased 19 per cent.

In a similar manner, wool is washed in water having 20 degrees of hardness. The resulting washed material shows about the same increase in whiteness over the soiled material.

*Example 5—Dye penetration.*—10 parts of extra-heavy wool felt are dyed for two hours in 300 parts of water containing 0.1 part Alizarine Saphire BLN of National Aniline & Chemical Company, 1.5 parts acetic acid and 0.5 part of the sodium sulphonate of stearyl ortho-toluidide containing inorganic salts and prepared as described in Example 1, part 1. The dyestuff penetrates the felt and there is obtained a satisfactorily dyed material. If the same process is carried out except that the sodium sulphonate of stearyl orthotoluidide is omitted from the dye bath, the dyestuff is deposited from the bath on the surface of the felt with very little penetration.

*Example 6—Wetting.*—A disc of No. 10 filter cloth cut to the size of a 25-cent piece is held by means of a Gooch crucible under the surface of an aqueous solution containing 1 part of the sodium sulphonate of stearyl ortho-toluidide (containing inorganic salts and prepared as described in Example 1, part 1) in 1000 parts of water while maintaining the temperature at 50 degrees C. The cloth disc will sink in about 1.5 minutes. If the same procedure is followed except that water is used in place of the aqueous solution of the sodium sulphonate of stearyl ortho-toluidide, the cloth disc will not sink in a period of about 5 hours.

Since the above description is given for the purpose of illustration, it will be understood the invention is not limited thereto, but that various changes and modifications may be made therein without departing from the scope of the invention as defined in the patent claims.

I claim:

1. The sulphonation product of an arylide of a fatty acid containing at least 5 carbon atoms, said arylide containing a substituent in the aryl nucleus ortho to the acylamino radical selected from the group consisting of halogen and the alkyl, aryl, alkoxy, aryloxy, carboxyl and esterified carboxyl radicals.

2. The sulphonation product of an arylide of a fatty acid containing at least 12 carbon atoms, said arylide containing a substituent in the aryl nucleus ortho to the acylamino radical selected from the group consisting of halogen and the alkyl, aryl, alkoxy, aryloxy, carboxyl and esterified carboxyl radicals.

3. A sulphonation product which in the form of the free acid corresponds with the following general formula:

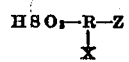

wherein R represents a substituted aromatic nucleus; X and Z represent substituents in the aromatic nucleus ortho to each other; X represents halogen or an alkyl, aryl, alkoxy, aryloxy, carboxyl or esterified carboxyl radical; and Z represents the radical:

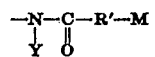

wherein Y represents hydrogen, an alkyl or a substituted alkyl radical, R' represents a saturated or unsaturated open chain aliphatic radical containing at least 4 carbon atoms and M represents a member of the group consisting of —H, —OH, —SO₃H, and —SO₄H.

4. The sulphonation product of an acyl anilide containing as a nuclear substituent ortho to the acylamino radical one of the group consisting of halogen and the alkyl, aryl, alkoxy, aryloxy, carboxyl and esterified carboxyl radicals, the acyl radical containing at least 5 carbon atoms.

5. The sulphonation product of an acyl anilide containing as a nuclear substituent ortho to the acylamino radical one of the group consisting of halogen and the alkyl, aryl, alkoxy, aryloxy, carboxyl and esterified carboxyl radical, the acyl radical containing from 12 to 18 carbon atoms.

6. The sulphonation product which in the form of the free acid corresponds with the following general formula:

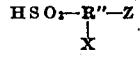

wherein R'' represents a benzene nucleus; and X and Z represent substituents in the benzene nucleus ortho to each other; X represents halogen or an alkyl, aryl, alkoxy, aryloxy, carboxyl, or esterified carboxyl radical; and Z represents the radical

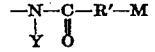

wherein Y represents hydrogen or an alkyl or a substituted alkyl radical, R' represents an open chain aliphatic radical containing at least 4 carbon atoms and which M represents a member of the group consisting of —H, —OH, —SO₃H and —SO₄H.

7. The sulphonation product of the ortho-toluidid of a fatty acid having at least 5 carbon atoms.

8. The sulphonation product of the ortho-toluidid of a fatty acid having from 12 to 18 carbon atoms.

9. The sulphonation product of the ortho-toluidid of stearic acid.

10. The sulphonation product of the ortho-toluidid of palmitic acid.

11. The sulphonation product of a mixture of the ortho-toluidids of the fatty acids produced by hydrolyzing cocoanut oil.

12. The sodium salt of the sulphonic acid of the ortho-toluidid of stearic acid, said sodium salt being a white, soft, solid, soluble in water and alcohol.

13. The process which comprises sulphonating the ortho-toluidid of a fatty acid containing 12 to 18 carbon atoms.

14. The process which comprises subjecting the ortho-toluidid of stearic acid to the action of a sulphonating agent, diluting the resulting mixture with water, neutralizing the water solution with caustic soda and evaporating to dryness.

15. The process which comprises adding the ortho-toluidid of stearic acid to a sulphonating mixture comprising sulphuric acid monohydrate and oleum, maintaining the resultant mixture at a temperature of 50° to 55° C. until a 1 c. c. sample of the mixture is substantially completely soluble in about 20 c. c. of water at about 60° C., pouring the mixture into water, neutralizing the solution with caustic soda, and evaporating the solution to dryness.

LAWRENCE H. FLETT.

CERTIFICATE OF CORRECTION.

Patent No. 2,166,949. July 25, 1939.

LAWRENCE H. FLETT.

It is hereby certified that error appears in the printed specification of the above numbered patent requiring correction as follows: Page 1, second column, line 48, for "benezene" read benzene; page 3, first column, line 72, for "sulphonic" read sulphuric; page 4, first column, line 12, for "grams" read grains; and second column, line 49, claim 6, strike out "which"; and that the said Letters Patent should be read with this correction therein that the same may conform to the record of the case in the Patent Office.

Signed and sealed this 19th day of September, A. D. 1939.

Henry Van Arsdale,
Acting Commissioner of Patents.

(Seal)